United States Patent
Nishihiro et al.

(10) Patent No.: US 10,495,221 B2
(45) Date of Patent: Dec. 3, 2019

(54) CONTROL DEVICE FOR VEHICLE AND CONTROL METHOD FOR VEHICLE

(71) Applicants: JATCO Ltd, Fuji-shi, Shizuoka (JP); NISSAN MOTOR CO., LTD., Yokohama-shi, Kanagawa (JP)

(72) Inventors: Yoshimasa Nishihiro, Zama (JP); Masayoshi Nakasaki, Isehara (JP); Naoki Kobayashi, Hadano (JP); Yusuke Oota, Ebina (JP); Shintaro Ohshio, Kanagawa (JP)

(73) Assignees: JATCO LTD, Fuji-Shi (JP); NISSAN MOTOR CO., LTD., Yokohama-Shi (JP)

( * ) Notice: Subject to any disclaimer, the term of this patent is extended or adjusted under 35 U.S.C. 154(b) by 71 days.

(21) Appl. No.: 15/764,344

(22) PCT Filed: Sep. 30, 2016

(86) PCT No.: PCT/JP2016/078997
§ 371 (c)(1),
(2) Date: Mar. 29, 2018

(87) PCT Pub. No.: WO2017/057666
PCT Pub. Date: Apr. 6, 2017

(65) Prior Publication Data
US 2018/0283548 A1   Oct. 4, 2018

(30) Foreign Application Priority Data
Oct. 2, 2015 (JP) .................................. 2015-196489

(51) Int. Cl.
*B60W 10/06* (2006.01)
*B60W 10/10* (2012.01)
*F16H 61/66* (2006.01)
(Continued)

(52) U.S. Cl.
CPC ............ *F16H 61/66* (2013.01); *B60W 10/02* (2013.01); *B60W 10/06* (2013.01);
(Continued)

(58) Field of Classification Search
CPC .... B60W 10/06; B60W 10/10; B60W 10/107; B60W 30/18072; B60W 2050/0008; F16H 61/66
See application file for complete search history.

(56) References Cited

U.S. PATENT DOCUMENTS 4,418,810 A   12/1983 Windsor
2002/0096414 A1   7/2002 Miyamoto
(Continued)

FOREIGN PATENT DOCUMENTS

JP   2013-122287 A   6/2013
JP   2013-213557 A   10/2013
(Continued)

*Primary Examiner* — Edwin A Young
(74) *Attorney, Agent, or Firm* — Foley & Lardner LLP

(57) ABSTRACT

A control device for a vehicle controlling the vehicle including a driving source and an automatic transmission coupled to the driving source and includes a power transmission mechanism including a forward engaging element. The control device for the vehicle includes a first control unit configured to execute a driving-source-stop-while-traveling control that stops the driving source and brings the automatic transmission into a neutral state when a driving-source-stop-while-traveling condition for stopping the driving source while traveling is satisfied and a second control unit configured to engage the forward engaging element on the basis of input and output rotation speeds of the power transmission mechanism after a driving-source-stop-while-traveling cancellation condition is satisfied.

6 Claims, 3 Drawing Sheets

(51) Int. Cl.
  *B60W 10/107* (2012.01)
  *F16H 59/74* (2006.01)
  *F16H 61/02* (2006.01)
  *F02D 29/02* (2006.01)
  *B60W 10/02* (2006.01)
  *B60W 30/18* (2012.01)
  *F16D 48/06* (2006.01)
  *B60W 50/00* (2006.01)
  *F16H 59/18* (2006.01)

(52) U.S. Cl.
  CPC .... *B60W 10/107* (2013.01); *B60W 30/18072* (2013.01); *F02D 29/02* (2013.01); *F16D 48/066* (2013.01); *F16H 59/74* (2013.01); *F16H 61/02* (2013.01); *B60W 2030/1809* (2013.01); *B60W 2050/0008* (2013.01); *B60W 2050/0096* (2013.01); *B60W 2510/0241* (2013.01); *B60W 2710/021* (2013.01); *B60W 2710/1005* (2013.01); *F16H 2059/186* (2013.01); *F16H 2059/746* (2013.01); *F16H 2061/661* (2013.01)

(56) References Cited

U.S. PATENT DOCUMENTS

| | | | |
|---|---|---|---|
| 2004/0117096 A1* | 6/2004 | Kang | B60W 10/06 701/54 |
| 2006/0089776 A1* | 4/2006 | Segawa | F16H 61/143 701/67 |
| 2007/0265137 A1 | 11/2007 | Jiang | |
| 2009/0209383 A1 | 8/2009 | Oslon et al. | |
| 2012/0010045 A1* | 1/2012 | Nedorezov | B60W 10/023 477/79 |
| 2013/0150208 A1 | 6/2013 | Wakayama et al. | |
| 2015/0119196 A1 | 4/2015 | Schiergl | |
| 2016/0221580 A1 | 8/2016 | Yamanaka et al. | |

FOREIGN PATENT DOCUMENTS

| | | |
|---|---|---|
| JP | 2015-113914 A | 6/2015 |
| WO | WO-2015/041044 A1 | 3/2015 |
| WO | WO-2015/068857 A1 | 5/2015 |

\* cited by examiner

CONTROL DEVICE FOR VEHICLE AND CONTROL METHOD FOR VEHICLE

TECHNICAL FIELD

The present invention relates to a control device for a vehicle and a control method for the vehicle.

BACKGROUND ART

Conventionally, JP2013-213557A discloses a control device for a vehicle which stops an engine, disengages a clutch, and executes a driving-source-stop-while-traveling control when an accelerator pedal is not pressed.

SUMMARY OF INVENTION

As the driving-source-stop-while-traveling control as described above, there is known a sailing stop control which stops the engine and disengages the clutch when, for example, a select lever is in a D range, a vehicle speed is at a medium, high vehicle speed, the accelerator pedal is not pressed, and a brake pedal is not pressed.

For example, when the sailing stop control is cancelled to engage a clutch, for example, the following procedure engages the clutch.

(1) After a sailing stop cancellation condition is satisfied, a hydraulic pressure to the clutch is precharged for a piston stroke of the clutch.

(2) An actual pressure of the clutch reaching a predetermined pressure is detected, and a command pressure of the clutch is increased to a standby pressure.

(3) After an engine start is completed, the actual pressure of the clutch being the standby pressure is detected, and the command pressure of the clutch is increased to an engaging pressure to fully engage the clutch.

Thus, it is known that the actual pressure of the clutch is fed back to set the command pressure of the clutch, and the clutch is engaged.

However, feeding back the actual pressure to set the command pressure of the clutch possibly shifts off a timing to engage the clutch due to a variation of the actual pressure of the clutch to cause an incorrect engagement of the clutch.

Thus, the clutch is possibly incorrectly engaged when the driving-source-stop-while-traveling control is cancelled to engage the clutch.

The present invention has been made to solve such a problem. The object is to prevent the incorrect engagement of the clutch when the driving-source-stop-while-traveling control is cancelled.

A control device for a vehicle according to a certain aspect of the present invention controls the vehicle including a driving source and an automatic transmission coupled to the driving source, and the automatic transmission includes a power transmission mechanism including a forward engaging element. The control device for the vehicle includes a first control unit a second control unit. The first control unit is configured to execute a driving-source-stop-while-traveling control when a driving-source-stop-while-traveling condition for stopping the driving source while traveling is satisfied, and the driving-source-stop-while-traveling control stops the driving source and brings the automatic transmission into a neutral state. The second control unit is configured to engage the forward engaging element on the basis of input and output rotation speeds of the power transmission mechanism after a driving-source-stop-while-traveling cancellation condition is satisfied.

According to another aspect of the present invention, a control method for a vehicle is provided. The control method controls the vehicle including a driving source and an automatic transmission coupled to the driving source, and the automatic transmission includes a power transmission mechanism including a forward engaging element. The control method for the vehicle includes executing a driving-source-stop-while-traveling control when a driving-source-stop-while-traveling condition for stopping the driving source while traveling is satisfied, and the driving-source-stop-while-traveling control stops the driving source and brings the automatic transmission into a neutral state. The control method for the vehicle also includes engaging the forward engaging element on the basis of input and output rotation speeds of the power transmission mechanism after a driving-source-stop-while-traveling cancellation condition is satisfied.

With these aspects, the forward engaging element is engaged on the basis of the input and output rotation speeds of the power transmission mechanism after the driving-source-stop-while-traveling cancellation condition is satisfied. This ensures preventing the incorrect engagement of the forward engaging element after the driving-source-stop-while-traveling cancellation condition is satisfied.

DESCRIPTION OF EMBODIMENTS

The following describes an embodiment of the present invention with reference to attached drawings. In the following, a speed ratio is a value found by dividing a rotation speed of an input shaft of a continuously variable transmission by a rotation speed of an output shaft of the continuously variable transmission. It is referred to as low when a speed ratio is large, and it is referred to as high when the speed ratio is small.

Figure 1:
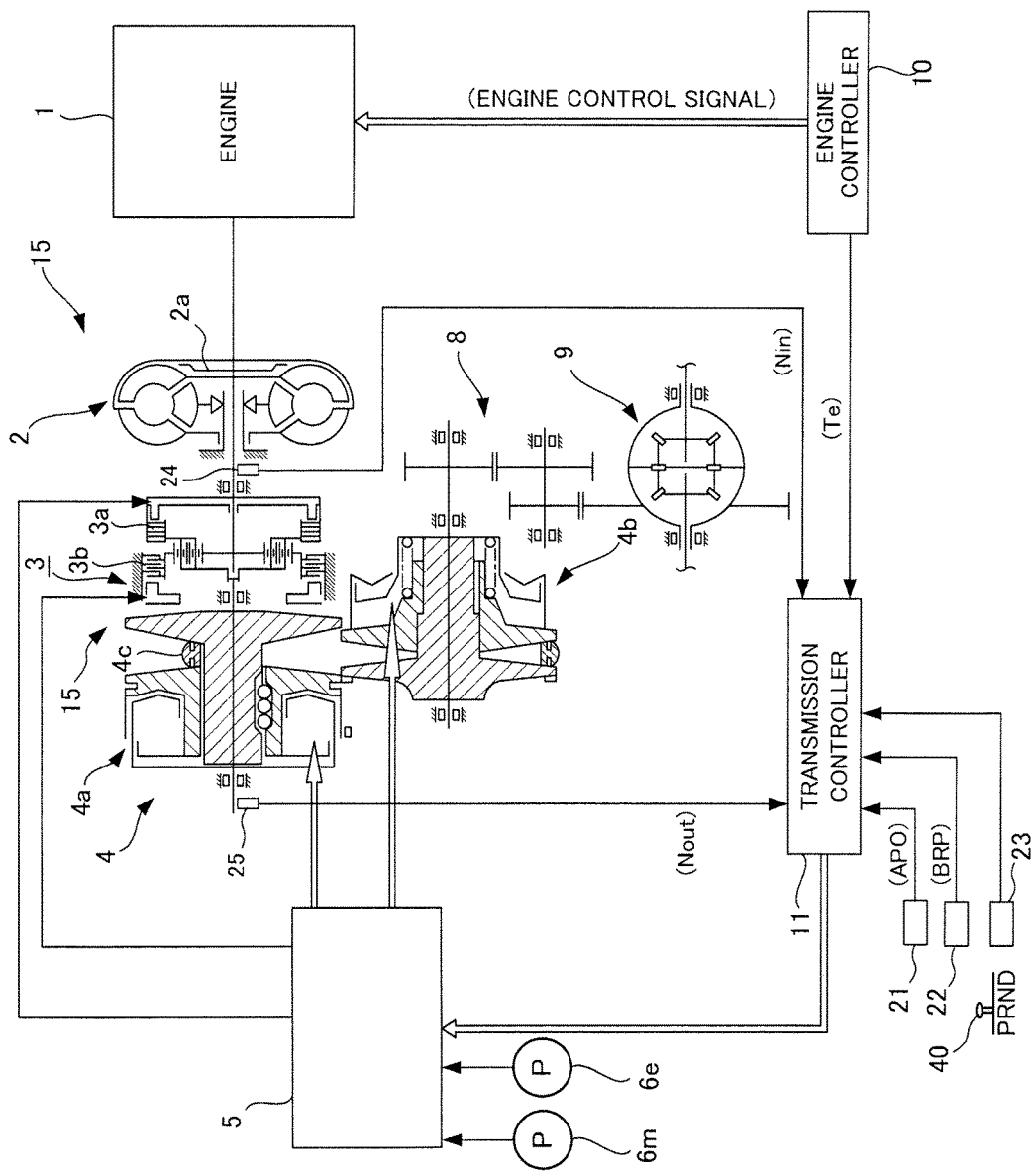
FIG. 1 is a schematic configuration diagram of a vehicle according to an embodiment.

FIG. 1 is a schematic configuration diagram of a vehicle according to the embodiment. A vehicle includes an engine 1, a torque converter 2, a forward/reverse switching mechanism 3 as a power transmission mechanism, a continuously variable transmission (a variator) 4, a hydraulic pressure control circuit 5, a first oil pump 6m, a second oil pump 6e, an engine controller 10, and a transmission controller 11. In the vehicle, a rotation generated by the engine 1 is transmitted to a wheel (not illustrated) via the torque converter 2, the forward/reverse switching mechanism 3, the continuously variable transmission 4, a gear set 8, and a differential gear unit 9. The forward/reverse switching mechanism 3 and the continuously variable transmission 4 constitute an automatic transmission 15.

The torque converter 2 includes a lock-up clutch 2a. An engagement of the lock-up clutch 2a directly couples an input shaft to an output shaft of the torque converter 2 to cause the input shaft and the output shaft to rotate at an identical speed.

The forward/reverse switching mechanism 3 includes a double pinion planetary gear set as a main component. Its sun gear is coupled to the engine 1 via the torque converter 2 and a carrier is coupled to a primary pulley 4a. The forward/reverse switching mechanism 3 further includes a forward clutch 3a that directly couples between the sun gear and the carrier of the double pinion planetary gear set and a backward brake 3b that secures a ring gear. The forward/reverse switching mechanism 3 directly transmits an input rotation via the torque converter 2 from the engine 1 to the primary pulley 4a when the forward clutch 3a is engaged. The forward/reverse switching mechanism 3 transmits the input rotation via the torque converter 2 from the engine 1 to the primary pulley 4a under reversing and decelerating when the backward brake 3b is engaged.

As states of the forward clutch 3a and the backward brake 3b, there are states of "disengage," "standby," "slip," and "engage." These states are switched corresponding to a hydraulic pressure Pf and a hydraulic pressure Pr supplied to each of piston pressure receiving chambers.

"Disengage" is a state where, no hydraulic pressure Pf is supplied to the forward clutch 3a and the forward clutch 3a does not have a torque capacity.

"Standby" is a state where, for example, while the hydraulic pressure Pf is supplied to the forward clutch 3a, the forward clutch 3a does not have the torque capacity. In the "standby" state, the forward clutch 3a is in a state immediately before having the torque capacity.

"Slip" is a state where, for example, the hydraulic pressure Pf is supplied to the forward clutch 3a, the forward clutch 3a has the torque capacity, and the forward clutch 3a has a rotation speed difference between input and output shafts of the forward clutch 3a. In the "slip" state, the torque capacity is smaller than an input torque of the forward clutch 3a.

"Engage" is a state where, for example, the hydraulic pressure Pf is supplied to the forward clutch 3a, the forward clutch 3a has the torque capacity, and the clutch has no rotation speed difference between the input and output shafts of the forward clutch 3a. In the "engage" state, the torque capacity is larger than the input torque of the forward clutch 3a. It should be noted that the "engage" state includes a full engagement where the torque capacity has a margin with respect to the input torque by further increasing the torque capacity after the torque capacity becomes larger than an input torque of the forward clutch 3a.

The continuously variable transmission 4 includes the primary pulley 4a, a secondary pulley 4b, and a belt 4c. In the continuously variable transmission 4, the hydraulic pressure supplied to the primary pulley 4a and the hydraulic pressure supplied to the secondary pulley 4b are controlled, thus changing a contact radius between each of the pulleys 4a and 4b and the belt 4c to shift the speed ratio.

The first oil pump 6m is a mechanical oil pump to which the rotation of the engine 1 input to drive the first oil pump 6m using a part of the power of the engine 1. The driving of the first oil pump 6m supplies the oil discharged from the first oil pump 6m to the hydraulic pressure control circuit 5. It should be noted that when the engine 1 is stopped, the first oil pump 6m is not driven and the oil is not discharged from the first oil pump 6m.

The second oil pump 6e is an electric oil pump driven by an electric power supply from a battery. Driving the second oil pump 6e when the first oil pump 6m is not driven ensures supplying the oil to the hydraulic pressure control circuit 5 even during the engine stop.

The hydraulic pressure control circuit 5 is constituted of a plurality of flow passages and a plurality of hydraulic actuators. The hydraulic actuator is constituted of a solenoid and a hydraulic control valve. The hydraulic pressure control circuit 5 controls the hydraulic actuator on the basis of a control signal from the transmission controller 11 to switch a supply passage of the hydraulic pressure and adjusts a necessary hydraulic pressure from a line pressure PL generated by an oil discharged from the first oil pump 6m and the second oil pump 6e. The hydraulic pressure control circuit 5 supplies the adjusted hydraulic pressure to each site of the continuously variable transmission 4, the forward/reverse switching mechanism 3, and the torque converter 2.

The transmission controller 11 is constituted of a CPU, a ROM, a RAM, and the like. In the transmission controller 11, the CPU reading and executing a program stored in the ROM provides a function of the transmission controller 11.

A signal from an accelerator position sensor 21 that detects an accelerator pedal opening APO, a signal from a brake fluid pressure sensor 22 that detects a brake fluid pressure BRP corresponding to an operating amount of the brake pedal, and a signal from an inhibitor switch 23 that detects a position of a shift lever 40 are input to the transmission controller 11. A signal from an input side rotational speed sensor 24 that detects a rotation speed Nin on an input side (an engine 1 side) of the forward/reverse switching mechanism 3, a signal from an output side rotational speed sensor 25 that detects a rotation speed Nout on an output side (a continuously variable transmission 4 side) of the forward/reverse switching mechanism 3, a signal relating to an engine torque Te from the engine controller 10 managing a control of the engine 1, and similar are input to the transmission controller 11.

In this embodiment, a sailing stop control is executed when a sailing stop condition is satisfied while the vehicle is traveling. The sailing stop control cancels a fuel injection to the engine 1 to stop the engine 1 and disengages the forward clutch 3a and the backward brake 3b in the forward/reverse switching mechanism 3 to cause a neutral state.

This lengthens a freewheeling distance in a state where the engine 1 is stopped, thereby ensuring an improved fuel efficiency of the engine 1.

The sailing stop condition is, for example, the following conditions.

(a) The shift lever 40 is in the D range.
(b) The vehicle speed Vsp is equal to or more than a first predetermined vehicle speed V1.
(c) The accelerator pedal is not pressed.
(d) The brake pedal is not pressed.

The first predetermined vehicle speed V1 is a medium, high vehicle speed and preliminarily set.

The sailing stop condition is satisfied when all the conditions (a) to (d) described above are fulfilled and is not satisfied when any of the above-described (a) to (d) is not fulfilled.

When the sailing stop condition is no longer satisfied during the sailing stop control, the sailing stop control is cancelled to start the engine 1 and engage the forward clutch 3a. That is, the sailing stop condition is also a sailing stop cancellation condition to cancel the sailing stop control. It should be noted that the sailing stop condition and the sailing stop cancellation condition may be different conditions.

When the sailing stop cancellation condition is satisfied, after the engine 1 is started and the forward clutch 3a is engaged, a normal running control is executed. From the sailing stop cancellation condition is satisfied to the normal running control is executed, the sailing stop cancellation control is executed. The sailing stop cancellation control engages the forward clutch 3a after an execution of a rotation synchronous control in which the engine 1 is started to synchronize the input and output rotation speeds of the forward clutch 3a. The sailing stop control, the rotation synchronous control, the sailing stop cancellation control, and similar control are executed by the transmission controller 11.

Figure 2:
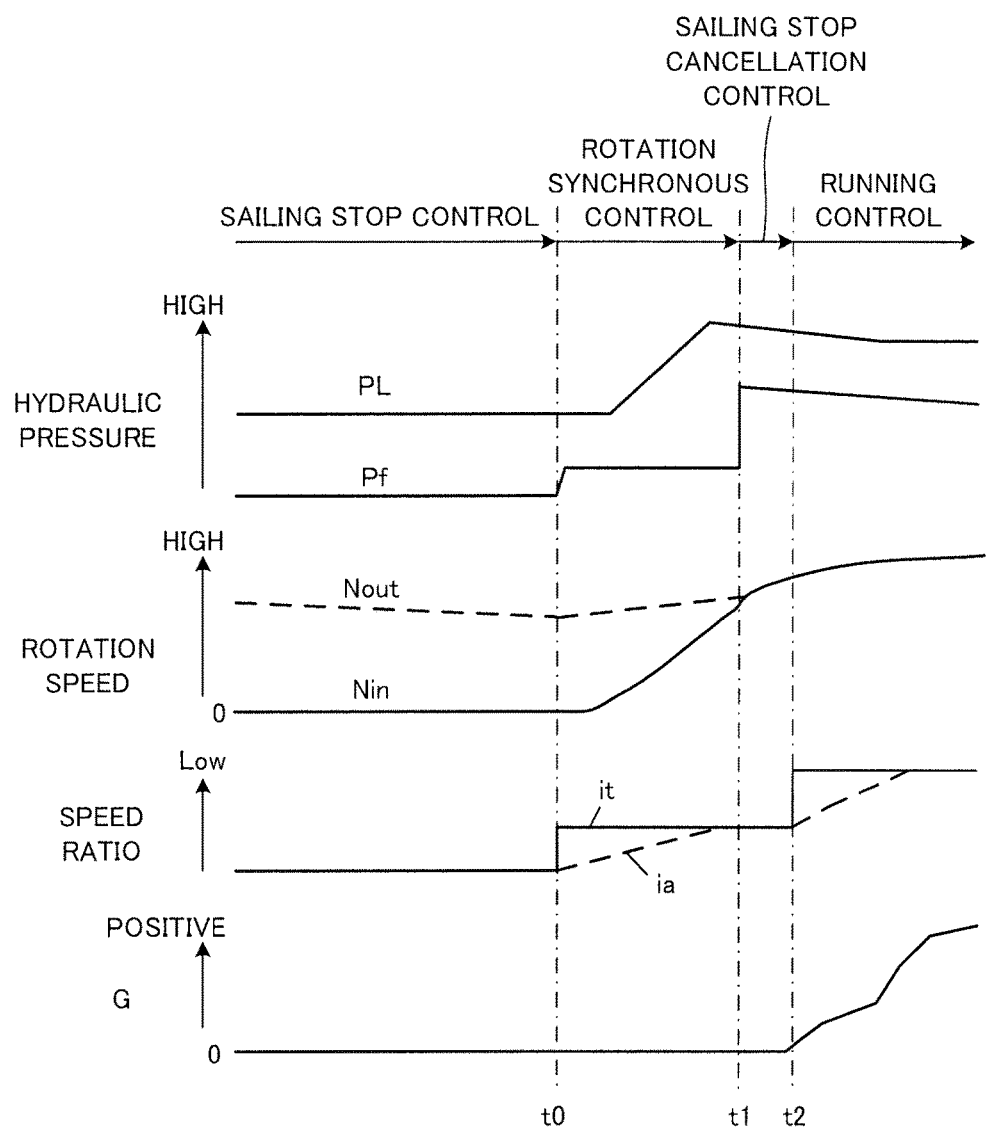
FIG. 2 is a timing chart when a sailing stop control according to the embodiment is cancelled.

Next, a description will be made for a case where the sailing stop control is cancelled using a timing chart in FIG. 2. FIG. 2 is a timing chart when this embodiment is used. Here, the sailing stop control is executed, the engine 1 is stopped, and the forward clutch 3a and the backward brake 3b are disengaged. It should be noted that the sailing stop control is executed at the medium, high vehicle speed; therefore, the speed ratio of the continuously variable transmission 4 is on the high side.

At a time t0, the sailing stop cancellation condition is satisfied and the rotation synchronous control is executed.

The engine 1 is started, the first oil pump 6m is driven by the start of the engine 1, the oil is discharged from the first oil pump 6m, and the line pressure PL is increased. The hydraulic pressure Pf supplied to the forward clutch 3a is controlled to a standby pressure that brings the forward clutch 3a into a standby state. The line pressure PL is generated by an oil discharged from the second oil pump 6e when the first oil pump 6m cannot sufficiently discharge an oil.

A target speed ratio it of the continuously variable transmission 4 is set to a speed ratio achieved by the hydraulic pressure that the oil discharged from the first oil pump 6m can supply to the continuously variable transmission 4. An actual speed ratio is of the continuously variable transmission 4 is changed following the target speed ratio it. Here, the target speed ratio it is set such that the continuously variable transmission 4 shifts to the low side to downshift. The target speed ratio it may be set, for example, corresponding to the accelerator pedal opening APO, and the larger the accelerator pedal opening APO becomes, the lower side the target speed ratio it is set.

A rotation speed Nin on the input side of the forward clutch 3a increases in association with the start of the engine 1. The continuously variable transmission 4 being shifted to the low side increases the rotation speed Nout on the output side of the forward clutch 3a.

At the time t1, an engaging command of the forward clutch 3a is made on the basis of the input and output rotation speeds of the forward/reverse switching mechanism 3. That is, when a relational expression including a difference or a ratio between the input and output rotation speeds as a parameter falls within a predetermined range, the engaging command is made. The predetermined range is a preliminarily set range. The predetermined range is a range of values within which an engagement shock at the time of an engagement is small or the engagement shock does not occur to give no uncomfortable feeling to a driver when the forward clutch 3a is engaged. That is, the relational expression falling within the predetermined range means that the rotation speed Nin on the input side of the forward clutch 3a and the rotation speed Nout on the output side synchronize.

For example, when the speed ratio of the forward/reverse switching mechanism 3 is in "R" when the forward clutch 3a is engaged, the following relation expression can derive whether to fall within the predetermined range.

(A) It can be determined to be synchronized when an absolute value of a difference between a value calculated by multiplying the rotation speed Nout on the output side by a speed ratio R and the rotation speed Nin on the input side is equal to or less than the predetermined value A. Accordingly, the engagement of the forward clutch 3a is performed when a relationship of the rotation speed Nin on the input side and the rotation speed Nout on the output side becomes "$-A \leq Nin-(R \times Nout) \leq A$". It should be noted that when the speed ratio R is 1, it is "$-A \leq Nin-Nout \leq A$".

(B) It can be determined to be synchronized when a ratio of the rotation speed Nin on the input side to the rotation speed Nout on the output side is within the range of "the speed ratio R±a predetermined value B". Accordingly, the engagement of the forward clutch 3a is performed when a relationship of the rotation speed Nin on the input side and the rotation speed Nout on the output side becomes "$R-B \leq Nin/Nout \leq R+B$". It should be noted that when the speed ratio R is 1, it is "$1-B \leq Nin/Nout \leq 1+B$".

It should be noted that in FIG. 2, it is illustrated the rotation speed Nin on the input side and the rotation speed Nout on the output side when the speed ratio R is 1.

The execution of the sailing stop cancellation control increases a command hydraulic pressure of the forward clutch 3a to increase the hydraulic pressure Pf supplied to the forward clutch 3a, thus engaging the forward clutch 3a. The command hydraulic pressure here is a hydraulic pressure with which the forward clutch 3a fully engages. It should be noted that in FIG. 2, an acceleration G of the vehicle is illustrated. When the acceleration G is a positive value, the vehicle accelerates and when the vehicle is a negative value, the vehicle decelerates. In this embodiment, the forward clutch 3a is engaged after the absolute value of the rotation speed difference between the input and output rotation speeds of the forward clutch 3a becomes smaller than the predetermined value; therefore, the acceleration G is approximately zero and the occurrence of the engagement shock is reduced.

In this embodiment, a rotation synchronization timing is thus foreseen on the basis of the input and output rotation speeds of the forward clutch 3a and at the rotation synchronization timing, the command hydraulic pressure of the forward clutch 3a is increased to engage the forward clutch 3a. Thus, in this embodiment, the engagement of the forward clutch 3a in the sailing stop cancellation control is performed by a feedforward control.

The normal running control is executed at a time t2 when a predetermined period elapses after the sailing stop cancellation control is executed. This sets the target speed ratio it of the continuously variable transmission 4 to the further low side and the actual speed ratio ia is changed following the target speed ratio it. The predetermined period is a preliminarily set period and is a period with which the forward clutch 3a is surely engaged.

Next, a comparative example that does not use this embodiment will be described using a timing chart in FIG. 3. In the comparative example, the forward clutch 3a is not disengaged during the sailing stop control but is held in a slip state immediately before a standby state. When the sailing stop cancellation condition is satisfied, the continuously variable transmission 4 is not shifted to the low side.

At the time t0, the sailing stop cancellation condition is satisfied. This starts the engine 1 similarly to this embodiment.

In the comparative example, the hydraulic pressure Pf supplied to the forward clutch 3a is detected by a hydraulic pressure sensor and the detection result is fed back to control the command hydraulic pressure of the forward clutch 3a. Then, when the hydraulic pressure Pf becomes equal to or more than the predetermined value, the command hydraulic pressure of the forward clutch 3a is increased to engage the forward clutch 3a. That is, after the sailing stop cancellation condition is satisfied, the forward clutch 3a is engaged by the feedback control. However, it is possible that the command hydraulic pressure is output such that the forward clutch 3a is engaged in a state where the rotation speed difference between the input and output rotation shafts of the forward clutch 3a is large due to the variation of the hydraulic pressure Pf supplied to the forward clutch 3a and then, the forward clutch 3a is engaged. The predetermined value is a preliminarily set value.

When the command hydraulic pressure is output and the forward clutch 3a is engaged at a time t1' where the rotation speed Nin on the input side is lower than the rotation speed Nout on the output side, a draw shock that appears as a negative acceleration G occurs in the vehicle.

Thereafter, at t2', the normal running control is executed.

Figure 3:
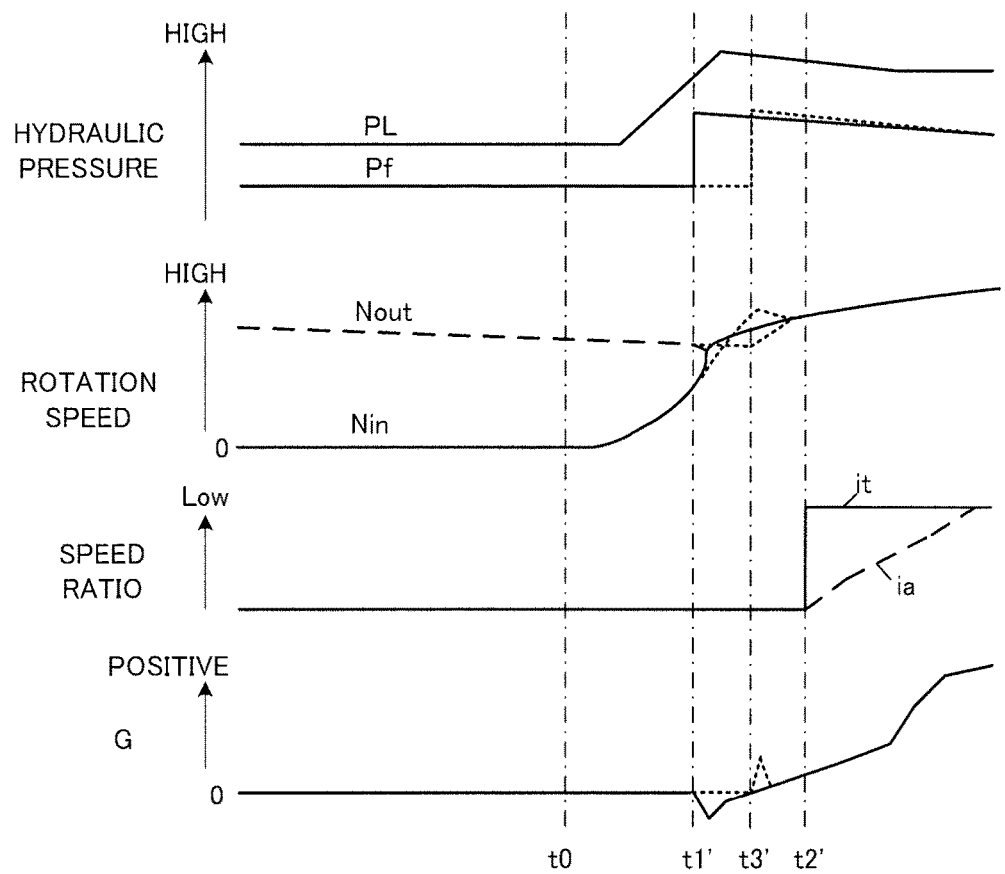
FIG. 3 is a timing chart illustrating a comparative example.

As indicated by the dotted line in FIG. 3, when the command hydraulic pressure is output so as to engage the forward clutch 3a and the forward clutch 3a is engaged at a time t3' where the rotation speed Nin on the input side becomes higher than the rotation speed Nout on the output side, an upthrust shock that appears as a positive acceleration G occurs in the vehicle.

It should be noted that in this embodiment, except for when the forward clutch 3a is engaged after the sailing stop cancellation condition is satisfied, for example, when the vehicle starts moving from a state of a vehicle stop and the forward clutch 3a is engaged, the forward clutch 3a is engaged by the feedback control as illustrated in the above-described comparative example. In other words, when the sailing stop cancellation condition is satisfied, the above-described feedback control is inhibited.

It should be noted that in this embodiment, while the continuously variable transmission 4 downshifts during the rotation synchronous control more than during the sailing stop control as illustrated in FIG. 2, when a downshifting amount is slight when the sailing stop control is cancelled, the rotation synchronous control may be executed without downshifting during the rotation synchronous control. For example, when the sailing stop control is cancelled with a small depression amount of the brake pedal and the brake force less than a predetermined brake force, executing the rotation synchronous control while maintaining on the high side (the speed ratio is a speed ratio smaller than "1," preferably, on the highest side, more preferably, the highest) ensures shortening a period of the rotation synchronous control.

Effects of the embodiment of the present invention will be described.

After the sailing stop cancellation condition is satisfied, the sailing stop cancellation control is executed on the basis of the input and output rotation speeds of the forward/reverse switching mechanism 3. That is, the rotation synchronization timing is foreseen on the basis of the input and output rotation speeds of the forward clutch 3a, and when the rotation synchronization timing comes, the command pressure of the forward clutch 3a is increased to engage the forward clutch 3a. This ensures preventing the incorrect engagement of the forward clutch 3a due to the variation of the hydraulic pressure supplied to the forward clutch 3a and reducing the occurrence of the engagement shock when the forward clutch 3a is engaged. Therefore, the uncomfortable feeling to the driver can be reduced.

After the sailing stop cancellation condition is satisfied and before the forward clutch 3a is engaged, the standby pressure is supplied to the forward clutch 3a and the forward clutch 3a is brought into the standby state. This ensures quickly engaging the forward clutch 3a when the forward clutch 3a is engaged.

Except for when the forward clutch 3a is engaged after the sailing stop cancellation condition is satisfied, the forward clutch 3a is engaged by the feedback control. When the sailing stop cancellation condition is satisfied, the feedback control is inhibited and the forward clutch 3a is engaged on the basis of the rotation speed difference between the input and output rotation speeds of the forward clutch 3a. This ensures engaging the forward clutch 3a by the feedback control in a normal operation, and after the sailing stop cancellation condition is satisfied, the forward clutch 3a is engaged on the basis of the input and output rotation speeds of the forward clutch 3a to ensure reducing the occurrence of the engagement shock when the forward clutch 3a is engaged.

Engaging the forward clutch 3a in a state where the speed ratio of the continuously variable transmission 4 is on the high side (the speed ratio is a speed ratio smaller than "1," preferably, on the highest side, more preferably, the highest) ensures shortening the period for the rotation synchronous control. That is, when the speed ratio of the continuously variable transmission 4 is on the high side, the rotation synchronous control can be executed in a state where the rotation speed Nin on the input side of the continuously variable transmission 4 is low (state of low engine rotation speed), thereby ensuring shortening the period for the rotation synchronous control.

The embodiment of the present invention described above is merely illustration of a part of application example of the present invention and not of the nature to limit the technical scope of the present invention to the specific constructions of the above embodiment.

While the above-described embodiment has described the automatic transmission 15 including the forward/reverse switching mechanism 3, an automatic transmission including a sub-transmission mechanism may be applied. The power transmission mechanism is a mechanism including the forward/reverse switching mechanism 3 and the sub-transmission mechanism. The automatic transmission 15 may be constituted by including a stepped transmission and a toroidal continuously variable transmission instead of the continuously variable transmission 4.

The above-described embodiment has described the sailing stop control as one example of the driving-source-stop-while-traveling controls. However, the driving-source-stop-while-traveling control may be, for example, a coast stop control. That is, when a driving-source-stop-while-traveling cancellation condition is satisfied to start the engine 1 and engage the forward clutch 3a after a driving-source-stop-while-traveling condition is satisfied to stop the engine 1 as the driving source and bring the forward/reverse switching mechanism 3 into the neutral state while traveling, the above-described control can be applied.

The coast stop control is executed by the transmission controller 11 when the coast stop satisfying condition is satisfied. The coast stop satisfying condition is, for example, the following (a) to (d).
(a) The shift lever 40 is in the D range.
(b) The vehicle speed Vsp is less than the predetermined vehicle speed.
(c) The accelerator pedal is not pressed.
(d) The brake pedal is pressed.

The predetermined vehicle speed is in a low vehicle speed and is a vehicle speed equal to or less than the vehicle speed at which the lock-up clutch 2a is disengaged.

The coast stop satisfying condition is satisfied when all the conditions in (a) to (d) are all fulfilled and is not satisfied when any of (a) to (d) is not satisfied. While the coast stop cancellation condition is, for example, an unsatisfaction of any of (a) to (d) during the coast stop control, the coast stop satisfying condition and the coast stop cancellation condition may be different conditions.

The above-described embodiment has described when the engine 1 is the driving source. However, the driving source may be, for example, a motor or the motor and the engine 1.

In the above-described embodiment, a single controller may be constituted of the transmission controller 11 and the engine controller 10. The transmission controller 11 may be constituted of a plurality of controllers.

The present application claims a priority based on Japanese Patent Application No. 2015-196489 filed with the Japan Patent Office on Oct. 2, 2015, all the contents of which are hereby incorporated by reference.

The invention claimed is:

1. A control device for a vehicle, the control device for the vehicle controlling the vehicle including a driving source and an automatic transmission coupled to the driving source, the automatic transmission including a power transmission mechanism including a forward engaging element, the control device for the vehicle comprising:
a controller configured to:
execute a driving-source-stop-while-traveling control when a driving-source-stop-while-traveling condition for stopping the driving source while traveling is satisfied, the driving-source-stop-while-traveling control stopping the driving source and bringing the automatic transmission into a neutral state;
engage the forward engaging element when input and output rotation speeds of the power transmission mechanism are synchronized after a driving-source-stop-while-traveling cancellation condition is satisfied; and
execute a feedback control, the feedback control fully engaging the forward engaging element, when an actual pressure of a piston pressure receiving chamber of the forward engaging element is detected to be a predetermined value or more, wherein
the controller inhibits the execution of the feedback control when the driving-source-stop-while-traveling cancellation condition is satisfied.

2. The control device for the vehicle according to claim 1, wherein
the controller supplies a standby pressure to the forward engaging element after the driving-source-stop-while-traveling cancellation condition is satisfied and before the forward engaging element is fully engaged.

3. The control device for the vehicle according to claim 1, wherein
the automatic transmission includes a variator, and
the controller engages the forward engaging element in a state where a speed ratio of the variator is on a high side.

4. The control device for the vehicle according to claim 1, wherein
the controller executes the driving-source-stop-while-traveling control when a brake is off.

5. A control method for a vehicle, the control method for the vehicle controlling the vehicle including a driving source and an automatic transmission coupled to the driving source, the automatic transmission including a power transmission mechanism including a forward engaging element, the control method for the vehicle comprising:
executing a driving-source-stop-while-traveling control when a driving-source-stop-while-traveling condition for stopping the driving source while traveling is satisfied, the driving-source-stop-while-traveling control stopping the driving source and bringing the automatic transmission into a neutral state;
engaging the forward engaging element when input and output rotation speeds of the power transmission mechanism are synchronized after a driving-source-stop-while-traveling cancellation condition is satisfied;
executing a feedback control, the feedback control fully engaging the forward engaging element, when an actual pressure of a piston pressure receiving chamber of the forward engaging element is detected to be a predetermined value or more; and
inhibiting the execution of the feedback control when the driving-source-stop-while-traveling cancellation condition is satisfied.

6. A control device for a vehicle, the control device for the vehicle controlling the vehicle including a driving source and an automatic transmission coupled to the driving source, the automatic transmission including a power transmission mechanism including a forward engaging element, the control device for the vehicle comprising:
first control means for executing a driving-source-stop-while-traveling control when a driving-source-stop-while-traveling condition for stopping the driving source while traveling is satisfied, the driving-source-stop-while-traveling control stopping the driving source and bringing the automatic transmission into a neutral state;
second control means for engaging the forward engaging element when input and output rotation speeds of the power transmission mechanism are synchronized after a driving-source-stop-while-traveling cancellation condition is satisfied; and
third control means for executing a feedback control, the feedback control fully engaging the forward engaging element, when an actual pressure of a piston pressure receiving chamber of the forward engaging element is detected to be a predetermined value or more, wherein
the third control means inhibit the execution of the feedback control when the driving-source-stop-while-traveling cancellation condition is satisfied.

* * * * *